(12) United States Patent
Salib et al.

(10) Patent No.: US 6,989,284 B2
(45) Date of Patent: Jan. 24, 2006

(54) FABRICATION OF A WAVEGUIDE TAPER THROUGH ION IMPLANTATION

(75) Inventors: Michael S. Salib, Los Gatos, CA (US); Michael T. Morse, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 10/159,379

(22) Filed: May 31, 2002

(65) Prior Publication Data

US 2003/0223696 A1  Dec. 4, 2003

(51) Int. Cl.
H01L 21/00 (2006.01)

(52) U.S. Cl. .......................................... 438/31; 438/514
(58) Field of Classification Search ................. 438/31, 438/32, 40, 43, 311, 514, 531, 535, 942
See application file for complete search history.

(56) References Cited

U.S. PATENT DOCUMENTS

| | | | |
|---|---|---|---|
| 4,371,966 A | 2/1983 | Scifres et al. | |
| 4,773,720 A | 9/1988 | Hammer | |
| 4,911,516 A | 3/1990 | Palfrey et al. | |
| 5,078,516 A | 1/1992 | Kapon et al. | |
| 5,121,182 A | 6/1992 | Kuroda et al. | |
| 5,349,602 A | * 9/1994 | Mehuys et al. | 372/98 |
| 5,442,723 A | 8/1995 | Vinchant et al. | |

(Continued)

FOREIGN PATENT DOCUMENTS

| | | |
|---|---|---|
| EP | 0 821 250 A1 | 1/1998 |
| JP | 52137359 | 11/1977 |
| JP | 53106152 | 9/1978 |
| JP | 05011131 | 1/1993 |
| JP | 09297235 | 11/1997 |
| JP | 11284061 | 10/1999 |
| WO | WO 95/13553 | 5/1995 |
| WO | WO 00/36442 | 6/2000 |
| WO | PCT/US 03/12364 | 8/2003 |
| WO | PCT/US 03/11833 | 10/2003 |
| WO | PCT/US 03/12364 | 6/2004 |
| WO | PCT/US03/12364 | 11/2004 |

OTHER PUBLICATIONS

Brenner, T., et al., "Vertically Tapered InGaAsP/InP Waveguides for Highly Efficient Coupling to Flat–End Single–Mode Fibers," American Institute of Physics, vol. 65, Aug. 15, 1994, pp. 798–800, Woodbury, NY, US.

Luo, Jianfeng, et al., "Integrated Model for Chemical–Mechanical Polishing Based on a Comprehensive Material Removal Model", Sixth International Conference on Chemical–Mechanical Polish (CMP) Planarization for ULSI Multilevel Interconnection (CMP–MIC), Mar. 8–9, 2001, pp. 1–8.

(Continued)

*Primary Examiner*—David Nhu
(74) *Attorney, Agent, or Firm*—Blakely, Sokoloff, Taylor & Zafman LLP

(57) ABSTRACT

A method to form a taper in a semiconductor layer. In one embodiment, the semiconductor layer is formed on a cladding layer. A mask layer is formed on the semiconductor layer. The mask layer is patterned and etched to form at least an angled region and a thick region. An ion implantation process is performed so that the portion under the angled region is implanted to have an interface or surface that is angled relative to the surface of the cladding layer. This angled surface forms part of the vertical taper. The implanted region does not contact the cladding layer, leaving an unimplanted portion to serve as a waveguide. The portion under the thick region is not implanted, forming a coupling end of the taper.

13 Claims, 4 Drawing Sheets

U.S. PATENT DOCUMENTS

| | | | |
|---|---|---|---|
| 5,574,742 A | 11/1996 | Ben-Michael et al. | |
| 5,708,750 A | 1/1998 | Kevorkian et al. | |
| 5,720,893 A | 2/1998 | Ben-Michael et al. | |
| 5,844,929 A | 12/1998 | Lealman et al. | |
| 5,867,623 A | 2/1999 | Broquin et al. | |
| 5,987,046 A | 11/1999 | Kobayashi et al. | |
| 5,990,530 A | 11/1999 | Suzuki | |
| 6,108,478 A | 8/2000 | Harpin et al. | |
| 6,174,748 B1 | 1/2001 | Jeon et al. | |
| 6,200,502 B1 | 3/2001 | Paatzsch et al. | |
| 6,219,366 B1 | 4/2001 | Furushima | |
| 6,229,947 B1 | 5/2001 | Vawter et al. | |
| 6,293,688 B1 | 9/2001 | Deacon | |
| 6,312,144 B1 | 11/2001 | Li | |
| 6,380,092 B1 | 4/2002 | Annapragada et al. | |
| 6,381,380 B1 | 4/2002 | Forrest et al. | |
| 6,385,371 B1 | 5/2002 | Li | |
| 6,411,764 B1 | 6/2002 | Lee | |
| 6,483,863 B2 | 11/2002 | Forrest et al. | |
| 6,516,117 B1 * | 2/2003 | Fujimaki et al. | 385/37 |
| 6,516,127 B1 | 2/2003 | Fluck et al. | |
| 6,522,801 B1 * | 2/2003 | Aksyuk et al. | 385/18 |
| 6,760,529 B2 | 7/2004 | Chong et al. | |
| 6,813,417 B2 | 11/2004 | Oh et al. | |
| 6,813,432 B2 | 11/2004 | Salib | |
| 6,813,471 B2 * | 11/2004 | Sawai et al. | 399/388 |
| 6,816,660 B2 | 11/2004 | Nashimoto | |
| 2002/0131744 A1 | 9/2002 | Evans et al. | |
| 2003/0007766 A1 | 1/2003 | Galarza et al. | |
| 2003/0068152 A1 | 4/2003 | Gunn, III | |

OTHER PUBLICATIONS

Smekalin, Konstantin, "CMP Dishing Effects In Shallow Trench Isolation", Magazine vol. 40, Issue 7, Jul. 1, 1997, pp. 1–6.

Layadi, A., et al., "Low–Loss Optical Waveguide On Standard SOI/SIMOX Substrate," Elsevier Science V.B., Optics Communications, North–Holland Publishing Co., Amsterdam, NL, vol. 146, No. 1–6, (Jan. 15, 1998) pp 31–33.

Weiss, B.L., et al., Optical Waveguides in SIMOX Structures, IEEE Photonics Technology Letters, vol. 3, No. 1, (Jan. 1991) pp 19–21.

Rickman, A., et al., "Low–Loss Planar Optical Waveguides Fabricated in SIMOX Material," IEEE Photonics Technology Letters, vol. 4, No. 6 (Jun. 1, 1992) pp 633–635.

Von Bibra, M.L., et al., "Ion Beam Energy Attenuation For Fabrication Of Buried Variable–Depth, Optical Waveguides," Nuclear Instruments & Methods In Physics Research, Section B: Beam Interactions with Materials and Atoms, vol. 168, No. 1 (May 2000) pp 47–52.

Hecht, J., "Understanding Fiber Optics," 1998, Prentice–Hall, $3^{rd}$ ed., p. 108.

* cited by examiner

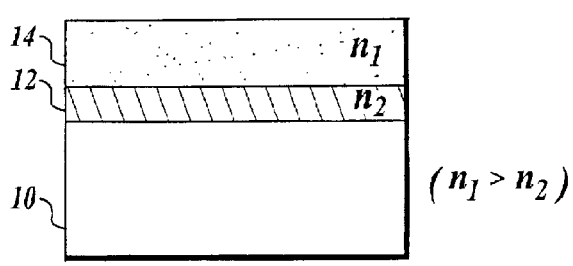
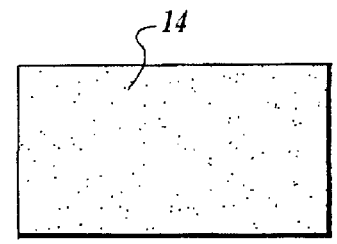
*Fig. 1*          *Fig. 1A*
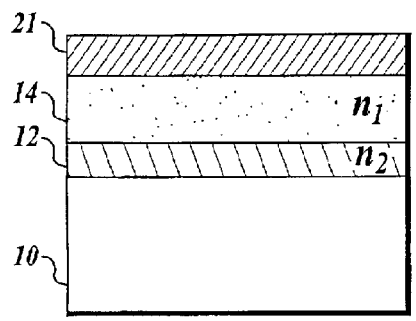
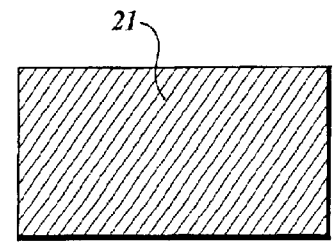
*Fig. 2*          *Fig. 2A*

FABRICATION OF A WAVEGUIDE TAPER THROUGH ION IMPLANTATION

CROSS REFERENCE TO RELATED APPLICATIONS

The present application is related to commonly-assigned and co-filed U.S. Patent Application Ser. No. Ser. No. 10/160,625 entitled "Method For Producing Vertical Tapers In Optical Waveguides By Over Polishing" by M. Salib, and to U.S. Patent Application Ser. No. Ser. No. 10/159,238 entitled "Epitaxial Growth For Waveguide Tapering" by M. Morse.

FIELD OF THE INVENTION

The field of invention relates to optical communication devices in general; and, more specifically but not limited to waveguide tapers in optical devices.

BACKGROUND

Some optical devices may include a waveguide that is intended to be coupled to another waveguide having a significantly larger cross-sectional size. For example, a planar lightwave circuit (PLC) can have a waveguide on the order of four microns in height to be coupled to an optical fiber with a diameter of about ten microns. One way to couple a port of a relatively large waveguide to a port of a significantly smaller waveguide is by forming a tapered waveguide structure to couple the two waveguides. In one type of taper, the taper at one end has a height or diameter of about the same size as the larger waveguide. At the other end, the taper typically comes to a point. The sides of the taper are typically straight so that the taper has a wedge-like shape, with the wider part of the taper being at the end of the waveguide. This end of the taper is used to couple the taper to the larger waveguide. The interior end of the taper serves as a termination, which along with the narrowing shape of the taper helps force light to propagate from the wide end of the taper to the smaller waveguide (or from the smaller waveguide to the wide end of the taper).

One conventional technique to form the above-described taper when the smaller waveguide is a semiconductor waveguide is to form the smaller waveguide with an end portion from which the taper is formed by etching. That is, at this end portion, the smaller waveguide has: (a) a length about equal to the desired length of the taper; and (b) a thickness that is about equal to the sum of the desired thickness of the smaller waveguide and the desired thickness of the taper. This thickness is typically the size of the fiber core (e.g., 8–10 $\mu$m).

This end portion of the smaller waveguide is then etched using standard etching techniques to form the taper with a shape as described above. However, some etching processes cause the taper's edge end to appear eroded and rough, instead of achieving the desired smooth sharp edge. A rough eroded edge can degrade performance of the taper. In addition, typical etching processes cause the etched surfaces to be significantly less smooth than the surfaces that are not etched. This roughness can increase the waveguide's loss (e.g., in some tests the etched surfaces increased loss by about an addition five dB/cm).

BRIEF DESCRIPTION OF THE DRAWINGS

Non-limiting and non-exhaustive embodiments of the present invention are described with reference to the following figures, wherein like reference numerals refer to like parts or elements having the same or substantially similar functions and/or structures throughout the various views unless otherwise specified. Further, terms such as "upper", "vertical", "lateral", "beneath", etc. may be used herein in describing the figures. These terms are used in a relative sense; i.e., to show relative orientation of the parts or elements as depicted in the figures and not necessarily with respect to gravity or as physical embodiments that may be oriented during use.

FIGS. 1 and 1A are representative cross-sectional and top views of a stage in fabricating a vertical taper, according to one embodiment of the present invention.

FIGS. 2 and 2A are representative cross-sectional and top views of another stage in fabricating a vertical taper, respectively, according to one embodiment of the present invention.

DETAILED DESCRIPTION

FIG. 1 illustrates a partial cross-section of a semiconductor workpiece (not to scale) during an early stage in fabricating a vertical taper, according to one embodiment of the present invention. The workpiece includes a semiconductor substrate 10, a cladding layer 12, and a core layer 14. In some embodiments, core layer 14 is formed from a semiconductor material while cladding layer 12 is formed from an insulating material (e.g., oxide) in which the refractive index $n_1$ of core layer 14 is greater than the refractive index $n_2$ of cladding layer 12. In this embodiment, core layer 14 is formed from silicon and cladding layer 12 is formed from silica ($SiO_2$).

More particularly, cladding layer 12 is formed between semiconductor substrate 10 and core layer 14. In this embodiment, semiconductor substrate 10 is formed from silicon; however, semiconductor substrate 10 can be formed from different semiconductor materials in other embodiments (e.g., Gallium Arsenide). Further, in this embodiment, cladding layer 12 is formed from a silicon oxide (e.g., $SiO_2$), although in other embodiments cladding layer 12 can be formed from other non-conductive materials.

In one embodiment, semiconductor substrate 10, cladding layer 12 and core layer 14 are formed using known silicon on insulator (SOI) wafer fabrication processes. For example, a buried oxide layer can be formed using known oxygen implantation processes to serve as cladding layer 12. Cladding layer 12, in this embodiment, has a thickness of about 1 μm, but can range from about 0.35 μm to 2 μm in other embodiments. Further, in this embodiment, core layer 14 is a silicon layer with a thickness of about 2.5 μm, but can have a thickness ranging from about 1 μm to 10 μm in other embodiments. FIG. 1A illustrates a top view of the resulting structure (not to scale), with core layer 14 being the only layer that is visible.

FIG. 2 illustrates a partial cross-section of the semiconductor workpiece (not to scale) during another stage in fabricating a vertical taper, according to one embodiment of the present invention. In this stage, an implant mask layer 21 is formed on core layer 14. Implant mask layer 21 can be photoresist or other material suitable for use as an implant mask (e.g., oxide, nitride, etc.). When formed using known photoresists, implant mask layer 21 has a thickness of about 2 μm in one embodiment. Basically, implant mask layer 21 should have an initial thickness great enough to prevent ions from entering core layer 14 when subjected to a subsequent ion implantation process (described below). FIG. 2A illustrates a top view of the resulting structure (not to scale), with implant mask layer 21 being the only layer that is visible.

Figure 3:
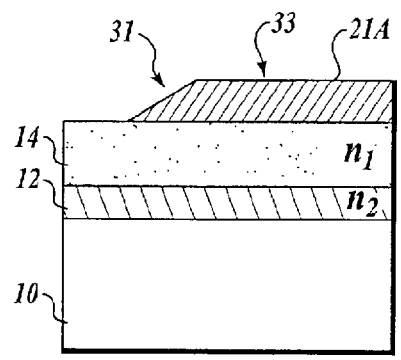
FIGS. 3 and 3A are representative cross-sectional and top views of still another stage in fabricating a vertical taper, respectively, according to one embodiment of the present invention.

FIG. 3 illustrates a partial cross-section of the semiconductor workpiece (not to scale) during another stage in fabricating a taper, according to one embodiment of the present invention. In this stage, implant mask layer 21 (FIG. 2) is patterned to define an angled region 31 using known photolithographic processes. In this embodiment, implant mask layer 21 is patterned using a suitable known grayscale photolithography process.

This "gray scale" patterning process results in a patterned implant mask layer 21A that includes angled region 31 and an essentially fully thick region 33 (also referred to herein as the intact region). Angled region 31 forms a transition from the thick region 33 to a region of no photoresist. The region with no photoresist defines a waveguide portion of core layer 14 (i.e., the waveguide), whereas angled region 31 and thick region 33 together define a vertical taper structure (described below in more detail) on the end of the waveguide. The resulting structure is illustrated in FIG. 3. Although in this embodiment angled region 31 has a linearly sloped surface (as shown in FIG. 3) the surface may be non-linearly (e.g., curved) sloped in other embodiments.

Figure 3A:
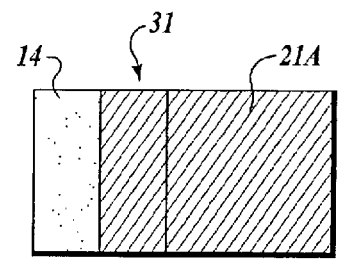

FIG. 3A illustrates a top view of the resulting structure (not to scale) showing patterned implant mask layer 21A (including angled region 31). In addition, a portion of core layer 14 is exposed.

When implant mask layer 21 (FIG. 2) is formed from oxide or nitride, known gray-scale etching processes can be used to pattern the implant mask layer to resemble FIG. 3.

In other alternative embodiments (not shown), implant mask layer 21 (FIG. 2) need not be patterned to expose the underlying core layer. Rather, the implant mask layer 21 can be patterned using gray scale patterning so that patterned implant mask layer 21A has a thinned area where the exposed area is located in FIG. 3. The thinned area should be thin enough to allow ions to penetrate through the thinned area during an ion implantation process (described below). In these alternative embodiments, patterned implant mask layer 21A will also have sloped and thick regions that are substantially similar to angled region 31 and thick region 33 described above.

Figure 4:
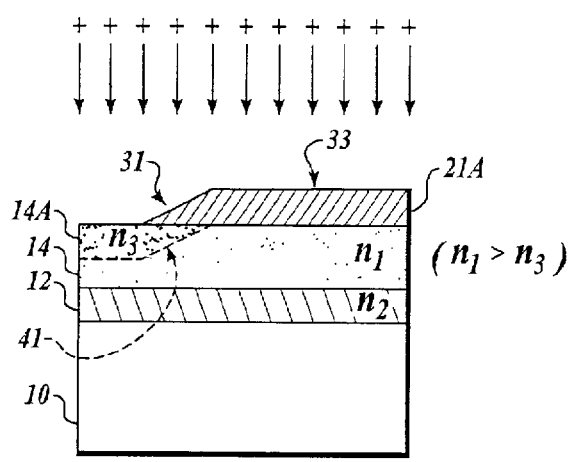
FIGS. 4 and 4A are representative cross-sectional and top views of yet another stage in fabricating a vertical taper, respectively, according to one embodiment of the present invention.

FIG. 4 illustrates a partial cross-section of the semiconductor workpiece (not to scale) during another stage in fabricating a vertical taper, according to one embodiment of the present invention. In this stage, an implantation process is performed to implant dopants in core layer 14 so as to change the refractive index of the implanted region to be less than that of the unimplanted region of core layer 14. This region is represented in FIG. 4 as a region 14A. In one embodiment in which core layer 14 is formed from silicon, ions are implanted in region 14A that reduce the refractive index of silicon.

In one embodiment, ions (e.g., oxygen ions are implanted with an energy in the range of 100–1000 keV to achieve a concentration of greater than ~$10^{20}$ ions/cm$^3$ in region 14A of core layer 14. With this implant energy, the ions do not penetrate into region 14A of core layer 14 through thick region 33, but do penetrate in region 14A through angled region 31. More specifically, ions penetrate into region 14A of core layer 14 through angled region 31 to a depth depending on the thickness of angled region 31 through which the ions pass through. The portion of the core layer under thick region 33 of patterned implant mask layer 21A remains free of implanted ions.

In other embodiments, different ions can be implanted in region 14A of core layer 14. For example, in embodiments in which core layer 14 is formed from silicon, nitrogen, germanium, carbon, and fluorine ions can be used in other embodiments. The implant energy and ion concentration depend on the ions being implanted, the material being implanted, and thickness of implant mask 21A.

Thus, as shown in FIG. 4 the profile of region 14A of core layer 14 is deepest in the areas left uncovered by patterned implant mask layer 21A. The depth monotonically decreases under angled region 31 as angled region 31 approaches (i.e., from left to right in FIG. 4) thick region 33. As a result, under angled region 31, region 14A of core layer 14 has a vertically angled interface or surface 41 relative to the upper surface of cladding layer 12. Stated another way, in this embodiment the plane containing angled surface 41 is angled (i.e., not perpendicular and not parallel) relative to the upper surface of cladding layer 12 (and to the upper surface of core layer 14). Angled surface 41 of region 14A serves as an angled surface of a vertical taper.

In addition, in this embodiment, region 14A is formed so that a relatively narrow (in thickness) portion of core layer 14 remains free of implanted ions under the portion of region 14A that is not covered by patterned implant mask layer 21A. Because the refractive indices of cladding layer 12 and region 14A of core layer 14 are less that that of the unimplanted portion core layer 14, this narrow unimplanted region serves as a waveguide. In one embodiment, this narrow region is designed to have a size that can support single mode propagation of an optical signal with a wavelength of about 1550 nm. In other embodiments, the thickness of this narrow region may be designed to support propagation in different modes and/or wavelengths. As will be described below, the vertical taper formed by the unimplanted region of core layer 14 under patterned implant mask layer 21A can be advantageously used to couple an optical signal (received from a larger waveguide or optical fiber) to the waveguide formed from the narrow region under region 14A.

This stage of the vertical taper fabrication process represents a significant improvement over conventional processes that etch silicon to form the taper. For example, as previously described, etching the silicon undesirably roughens the etched surfaces of the taper, increasing loss. In contrast, in accordance with embodiments of the present invention, the vertically angled surface of the vertical taper is not etched. Rather, the vertically angled surface is "defined" by a region of lower refractive index that is formed by ion implantation. Consequently, the vertical taper formed by ion implantation of core layer 14 will generally have less loss than one that is formed by etching.

Figure 4A:
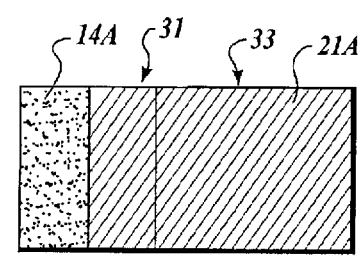

FIG. 4A illustrates a top view of the resulting structure (not to scale). As shown, region 14A of core layer 14 is visible, along with angled region 31 and thick region 33 of patterned implant mask layer 21A.

Figure 5:
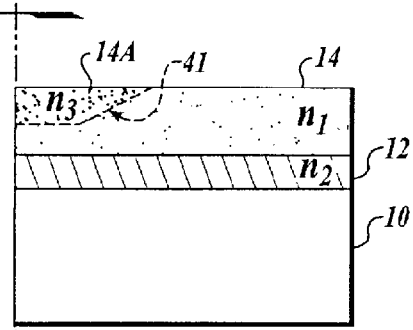
FIGS. 5 and 5A are representative cross-sectional and top views of still yet another stage in fabricating a vertical taper, respectively, according to one embodiment of the present invention.
Figure 5A:
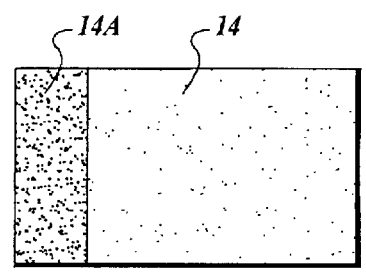

FIG. 5 illustrates a partial cross-section of the semiconductor workpiece (not to scale) during still another stage in fabricating a vertical taper, according to one embodiment of the present invention. In this stage, patterned implant mask layer 21A is removed. In embodiments in which photoresist is used to form patterned implant mask layer 21A, known photoresist stripping processes can be used to remove patterned mask layer 21A. In embodiments in which oxide, nitride or other mask materials are used, known selective etching processes can be used to remove implant mask layer 21A. Thus, core layer 14 (including region 14A) is exposed. The resulting structure is shown in FIGS. 5 and 5A.

In subsequent processing steps, core layer 14 (including region 14A) can be patterned and etched to form a waveguide. In addition, this patterning and etching process can form a lateral taper (not shown) in the unimplanted portion of core layer 14. In other embodiments, implant mask layer 21A can be patterned to form the lateral taper. A lateral taper can improve coupling the waveguide to another waveguide or optical fiber that has a larger cross sectional area than the waveguide formed in core layer 14. Although not shown, a protective layer (e.g. oxide, nitride, etc.) can be formed over the structure shown in FIGS. 5 and 5A in subsequent processing steps.

Figure 6:
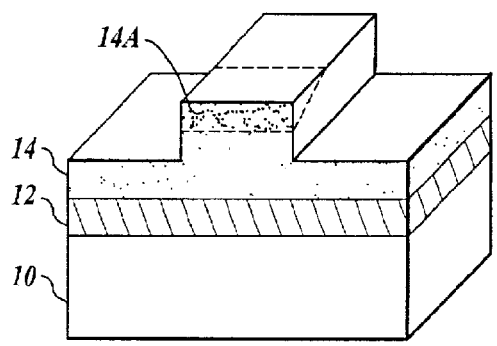
FIG. 6 is representative isometric perspective view of a section cut as indicated in FIG. 5, according to an embodiment of the present invention.

FIG. 6 illustrates a perspective view of a section cut as indicated in FIG. 5 after core layer 14 has been patterned and etched to form a waveguide as part of a PLC. In this embodiment, the waveguide is a rib waveguide. In operation, for example, an optical fiber can be coupled to the "rear" end of the structure illustrated in FIG. 5 so that an optical signal can propagate from the optical fiber into core layer 14. In this view, the optical signal would propagate perpendicular to the plane of the page/drawing. Because region 14A of core layer 14 has a lower refractive index than the rest of core layer 14, the optical signal is constrained to propagate downwards by angled surface 41 (FIG. 4) of region 14A.

Further, although embodiments for vertical taper applications are described above, other embodiments may be used in other mode converter applications as well.

Figure 7:
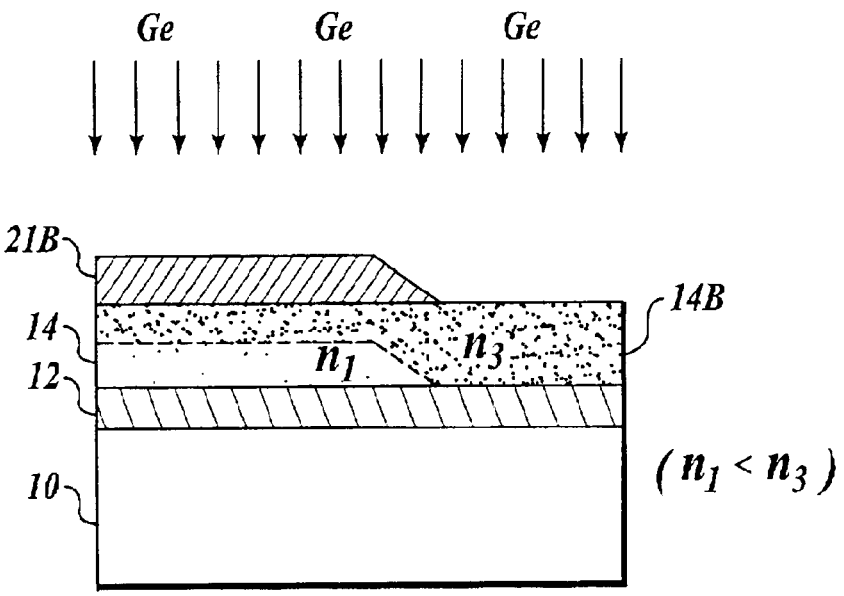
FIG. 7 is a representative cross-sectional view of a stage in fabricating a vertical taper, according to an alternative embodiment of the present invention.

FIG. 7 illustrates a stage in an alternative embodiment of fabricating a vertical taper. In the embodiment illustrated in FIG. 7, implant mask layer 21 (FIG. 2) is patterned to leave the bulk of the taper region uncovered. This implant mask is illustrated in FIG. 7 as patterned implant mask layer 21B. The thickness of patterned implant mask layer 21B is designed so that the thick region does not completely prevent ion implantation. Rather, a relatively thin upper portion of core layer 14 disposed beneath the thick region of patterned implant mask 21B will be implanted.

As in the previously described embodiments, the portion of the core layer under the angled region of the patterned implant mask will have an angled surface, whereas the uncovered portion will be essentially completely implanted. In this embodiment, the ions used in the ion implantation process are selected to reduce the refractive index of the implanted region 14B relative to the rest of core layer 14. For example, when core layer 14 is formed from silicon, germanium ions may be used. Patterned implant mask layer 21B is then removed, and core layer 14 (including region 14B) is then patterned and etched to form a waveguide using known processes. This embodiment operates in essentially the same manner as the previously described embodiments, except that the waveguide is now in the upper portion of core layer 14 rather than in the lower portion as in the previously described embodiments.

Figure 8:
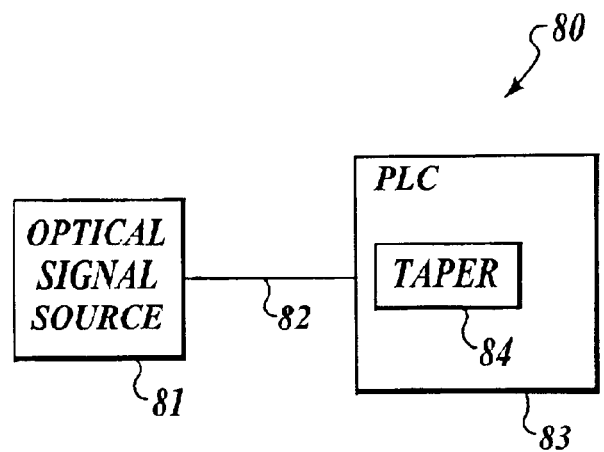
FIG. 8 is a block diagram illustrating an exemplary system using a taper fabricated according to embodiments of the present invention.

FIG. 8 illustrates a system 80 in which a waveguide taper according to embodiments of the present invention can be used. System 80 includes an optical signal source 81 connected to one end of an optical fiber 82. The other end of optical fiber 82 is connected to a PLC 83 that includes a taper 84. Taper 84 is fabricated according to one of the embodiments described above. For example, when the taper is implemented as shown in FIG. 6, the "rear" end of the illustrated structure could be used to couple optical fiber 82 to PLC 83. In one embodiment, PLC 83 is implemented in an integrated circuit. Other embodiments may have one or more other tapers (not shown) that are essentially identical in structure to taper 84.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the forgoing specification, the invention has been described with reference to specific exemplary embodiments thereof. It will, however, be evident that various modification and changes may be made thereto without departing from the broader spirit and scope of the invention as set forth in the appended claims. The specification and drawing are, accordingly, to be regarded in an illustrative rather than a restrictive sense.

What is claimed is:

1. A method for fabricating a taper, comprising:
   forming a cladding layer over a substrate;
   forming a core layer on the cladding layer; and
   implanting ions in a portion of the core layer so that an implanted portion has a surface that is angled relative to a surface of the cladding layer, wherein the implanted ions cause the implanted portion to have a refractive index that is different from an unimplanted portion of the core layer.

2. The method of claim 1 wherein the cladding and core layers are formed using a silicon on insulator (SOI) wafer.

3. The method of claim 1 wherein implanting ions comprises:
   forming a mask layer on the core layer; and
   removing a portion of the mask layer to form an angled region in the mask layer.

4. The method of claim 1 wherein the mask layer is formed using a gray scale lithography process.

5. The method of claim 4 wherein the mask layer comprises photoresist.

6. The method of claim 4 wherein the mask layer comprises oxide.

7. The method of claim 1 wherein the core layer is formed from a semiconductor material.

8. The method of claim 1 wherein the ions are oxygen ions.

9. The method of claim 1 wherein the implanted portion contacts the cladding layer.

10. The method of claim 1 wherein the implanted portion does not contact the cladding layer.

11. The method of claim 1 wherein the refractive index of the implanted portion is greater than that of the unimplanted portion of the core layer.

12. The method of claim 1 wherein the ions implanted in the implanted portion comprise germanium ions.

13. The method of claim 12 wherein the refractive index of the implanted portion is greater than that of the unimplanted portion of the core layer.

* * * * *

UNITED STATES PATENT AND TRADEMARK OFFICE
CERTIFICATE OF CORRECTION

PATENT NO. : 6,989,284 B2
DATED : January 24, 2006
INVENTOR(S) : Salib et al.

It is certified that error appears in the above-identified patent and that said Letters Patent is hereby corrected as shown below:

Column 7,
Line 10, after "layer," insert -- to fabricate the taper without etching, --.
Line 22, delete "1" and insert -- 3 --.

Column 8,
Line 20, delete "greater" and insert -- less --.

Signed and Sealed this

Eighteenth Day of April, 2006

JON W. DUDAS
*Director of the United States Patent and Trademark Office*